United States Patent [19]

Bando

[11] 4,341,129

[45] Jul. 27, 1982

[54] SYSTEM OF CHANGING TRAVELLING SPEED OF WORKING VEHICLE

[75] Inventor: Niro Bando, Sakai, Japan

[73] Assignee: Kubota, Ltd., Osaka, Japan

[21] Appl. No.: 134,399

[22] Filed: Mar. 27, 1980

[30] Foreign Application Priority Data

Oct. 13, 1979 [JP] Japan .......................... 54/141687[U]

[51] Int. Cl.³ .......................... G05G 1/14; G05G 5/04; G05G 11/00
[52] U.S. Cl. ...................................... 74/481; 74/474; 74/526; 192/4 A
[58] Field of Search ................. 74/474, 481, 482, 526; 192/3 M, 4 A

[56] References Cited

U.S. PATENT DOCUMENTS

| 2,072,285 | 3/1937 | Walker | 74/482 |
| 3,316,773 | 5/1967 | Findlay | 74/481 |
| 3,511,105 | 5/1970 | Matter | 74/481 |
| 4,059,025 | 11/1977 | Waack et al. | 74/482 |

Primary Examiner—Allan D. Herrmann
Attorney, Agent, or Firm—Edwin E. Greigg

[57] ABSTRACT

A system of changing the travelling speed of a working vehicle in which a stepless speed-change means is operated by a pedal. Said system has a cam mechanism by which the pedal may be fixed at the desired position, and a first manual lever for operating this cam mechanism.

5 Claims, 4 Drawing Figures

SYSTEM OF CHANGING TRAVELLING SPEED OF WORKING VEHICLE

BACKGROUND OF THE INVENTION

The present invention relates to a system of changing the travelling speed of a working vehicle, and more particularly to a system in which a stepless speed-change means is operated by a pedal.

A working vehicle for example a tractor is mainly used for work, such as farming work, which is desired to be performed with the travelling speed of such tractor maintained substantially constant.

To provide such constant speed by a pedal operation may provoke fatigue of the operator foot and such pedal operation itself is not stable. Therefore, it has been difficult to maintain the travelling speed substantially constant.

Furthermore, when a tractor is to be moved from a certain working place to a different one, such tractor is generally moved at a speed higher than the working speed. Therefore, when the tractor speed is to be again reduced to the working speed, it has disadvantageously been difficult to set the tractor speed immediately to the initial working speed.

SUMMARY OF THE INVENTION

It is an object of the present invention to remedy deficiency of prior art above-mentioned and to provide a system of changing the travelling speed of a working vehicle in which the desired change in speed may be provided by operation of a pedal and the pedal may be fixed at any pressed position so that, even if the operator foot is released from the pedal, the desired travelling speed may securely be maintained, whereby an efficient work may be performed.

In order to achieve the objects above-mentioned, a system of changing the travelling speed of a working vehicle in accordance with the present invention comprises a pedal for operating a stepless speed-change means, spring means for spring-loading the stepless speed-change means to the neutral position, an operating unit for speed change to interlockingly connect the stepless speed-change means with the pedal, a first manual lever for operating the stepless speed-change means, spring means for maintaining the first manual lever at its operated position, cam means adapted to permit the stepless speed-change means to be operated in the speed increasing direction by the pedal and adapted to prevent the stepless speed-change means from being operated to its neutral position, and coupling means to interlockingly connect the cam means with the operating unit for speed change.

According to the present invention, by operating the first manual lever, the pedal is operated through the cam means and the stepless speed-change means interlocked with the pedal may be fixed at the desired travelling speed position. Accordingly, even if the operator foot is released from the pedal, the working vehicle may travel at the desired speed, whereby, without fatigue of the operator, work of all sorts required to be performed with the working vehicle travel at a constant speed may efficiently be performed.

Furthermore, the present invention is so arranged that, when the working vehicle is to be moved from a working place to a different one, the vehicle travelling speed may temporarily be increased; that is, by pressing the pedal, the working vehicle may quickly be moved at a high speed. Thereafter, releasing the foot from the pedal advantageously provides the initial working speed in an automatic manner.

Such constant speed may be very useful not only for work, but also for other various conditions required.

It is another object of the present invention to permit a maximum travelling speed to be set by disposing a second manual lever, thereby to automatically prevent the travelling speed from being exceedingly increased due to excessive pressing of the pedal, whereby a safe and stable work may be performed within a predetermined speed range.

Other objects and advantages will be apparent from the following description.

BRIEF DESCRIPTION OF THE DRAWINGS

The present invention will be described by way of example with reference to the accompanying drawings in which.

DETAILED DESCRIPTION OF THE PREFERRED EMBODIMENTS

Figure 1:
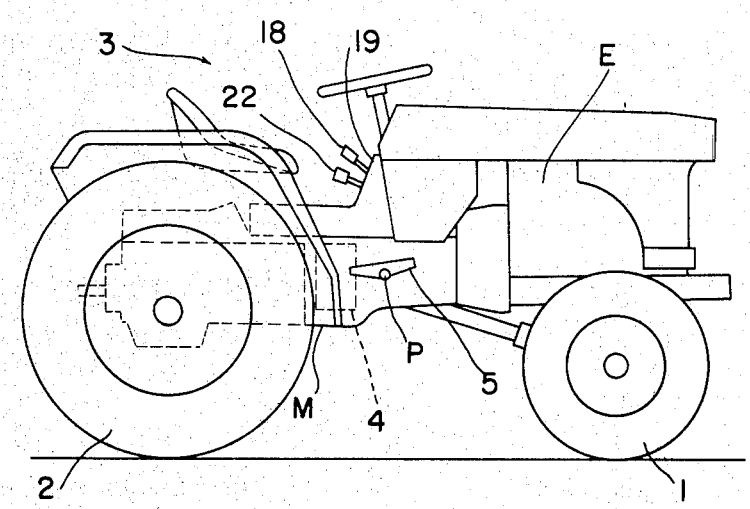
FIG. 1 is a general side view of a working vehicle which incorporates a system of changing the travelling speed of a working vehicle in accordance with the present invention.

As shown in FIG. 1, a travelling vehicle body journals front wheels 1 and rear wheels 2 and has a steering unit 3. An engine E is disposed at the front side of the travelling vehicle body, and a fluid pressure-type stepless speed-change means 4 and a transmission M are disposed at the rear side thereof. Power from the engine E is adapted to be transmitted to the front and rear wheels 1 and 2 through the stepless speed-change means 4 and the transmission M, thus forming a tractor as one example of a working vehicle which permits one to perform varieties of work, while travelling with a working machine such as a rotary cultivator interlockingly connected to the rear end of such tractor.

In this embodiment, as the stepless speed-change means 4, a fluid pressure-type stepless speed-change means of the axial plunger type is proposed, but there may also be used a stepless speed-change means using split pulleys.

Figure 2:
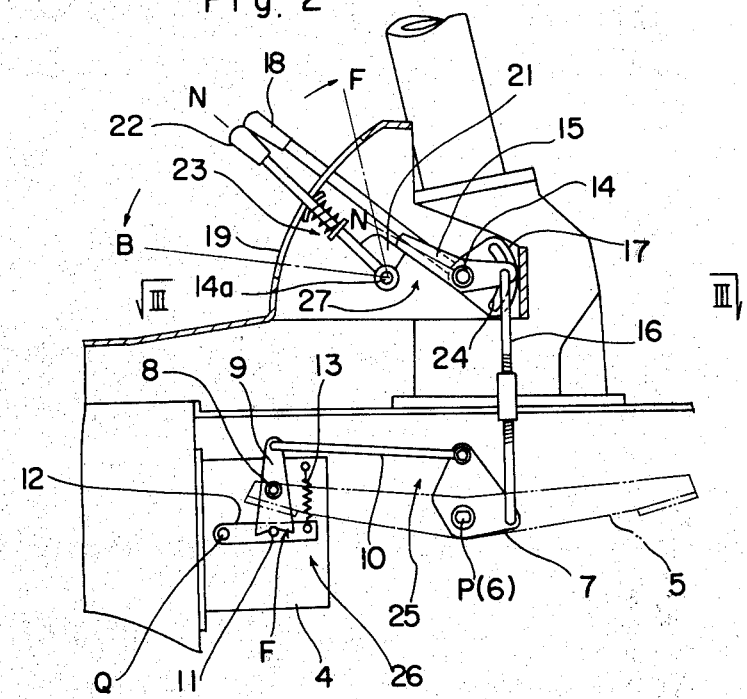
FIG. 2 is an enlarged side view, with portions broken away, of main portions in FIG. 1.

As shown in FIG. 2, the steering unit 3 has a pedal 5, as one example of operating means, disposed in a manner swinging around the transverse axis P. A first plate member 7 is connected to a support shaft 6 to which the pedal 5 is swingingly attached in a unitary construction. This first plate member 7 is interlockingly connected, through a rod 10, to a second plate member 9 connected to an operating shaft 8 of the speed-change means 4. Thus, according to the reciprocal swinging operation of the pedal 5, the forward and backward travelling speeds may steplessly be changed. The first plate member 7, the rod 10 and the second plate member 9 constitute an operating unit for speed change 25.

The second plate member 9 has a cam surface F having at the center thereof a concaved portion. A cam 11 adapted to act on the cam surface F is disposed on an arm 12 attached in a manner swinging around a transverse axis Q.

A tension spring 13 is attached to the arm 12 so as to normally press the cam 11 toward the cam surface F. By such cam action the speed-change means 4 is automatically reset to its neutral position when the speed-change means 4 is operated against the spring force of the spring 13 and the operator foot is then released from the pedal 5. The spring 13, the second plate member 9, the cam 11 and the arm 12 constitute means 26 for spring-loading the stepless speed-change means 4 to the neutral position.

A support shaft 14 is disposed above and in parallel with the pedal support shaft 6. An angle-shape arm member 15 is rotatably attached to the support shaft 14 which is located at the center of the arm member 15.

Figure 3:
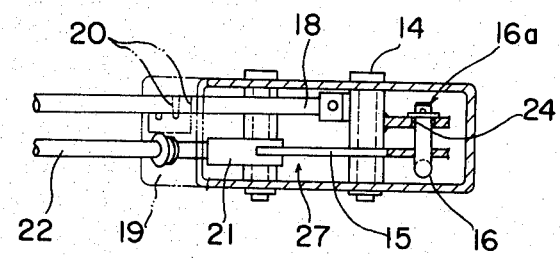
FIG. 3 is a section view taken along the line III—III in FIG. 2.

A telescopic rod 16 has one end connected to the first plate member 7 and the other end connected to the arm member 15 such that the rod 16 passes through the arm member 15 from one side to the other side thereof as shown in FIG. 3.

A second manual lever 18 as a maximum speed setting means has a sector member 17 and is located at one side with respect to the arm member 15. This second manual lever 18 is swingingly attached to the support shaft 14 and is adapted to be fixed when engaged with engagement portions 20 formed in a guide panel 19.

A first manual lever 22 serving as a minimum speed setting means and a means for setting a constant speed including a low speed and a high speed, is swingingly attached to a support shaft 14a in parallel with the support shaft 14. This first manual lever 22 is connected to a contact member 21 adapted to act on the free end of the arm member 15 opposite to the end thereof connected to the rod 16. The first manual lever 22 is adapted to be fixed by a spring loaded frictional engaging means 23 disposed between the panel 19 and operative relative to the first manual lever 22.

The arm member 15 and the contact member 21 form a cam means 27 which permits the stepless speed-change means 4 to be operated in the forward speed increasing direction by depressing the pedal 5 and prevents the stepless speed-change means 4 from being operated to its neutral position direction.

With respect to the arrangement and the shapes of the cam surfaces to be contacted of the arm member 15 and the contact member 21, provision is made such that the first manual lever 22 is returned to the neutral position when force more than the spring-load of the spring 13 to return the stepless speed-change means 4 to the neutral position, is exerted to the arm member 15 according to a brake operation, regardless of the forward travelling position to which the first manual lever 22 is set.

The sector member 17 has therein a slot 24 formed into an arc of a circle having a center at the axis of rotation of the sector member 17. The portion 16a of the rod 16 projecting from the arm member 15 is engagingly inserted into the slot 24. Such contact of the projecting portion 16a with the longitudinal lower end of the slot 24 prevents the movement of the projecting portion 16a. This means such contact blocks a forward speed increasing operation performed by the pedal 5 at a predetermined position, whereby a maximum speed may be set. Such maximum speed may be changed by changing the position where the second manual lever 18 is engagingly fixed.

The contact of the arm member 15 with the contact member 21 prevents the pedal 5 to be returned to the neutral side from the forward travelling side, and maintains it at a predetermined position, whereby a minimum speed may be set. Such minimum speed may be changed by changing the position where the first manual lever 22 is fixed.

With such arrangement, by changing the fixed positions of the manual levers 18 and 22 there may suitably be selected a desired speed-change range including a status where the pedal 5 is permitted to be operated in both forward and backward directions over the maximum range permitted by the initial setting operation, a status where the pedal 5 is prevented from returning to the neutral position N after the operator foot has been released from the pedal 5 and a speed-change operation only either in the forward side F or in the backward side B may be performed, and a status where a speed-change operation may be performed only in a predetermined range at the high speed side or low speed side in the forward speed-change status above-mentioned.

Furthermore, as apparent from the construction discussed hereinbefore, when only the first manual lever 22 is operated with the rod connection of the second manual lever 22 to the first manual lever 18 is disconnected, such first manual lever 22 may be utilized as a constant speed setting means by which the stepless speed-change means 4 may be set to the desired speed and such desired speed may be maintained even though the operator foot is released from the pedal 5.

Figure 4:
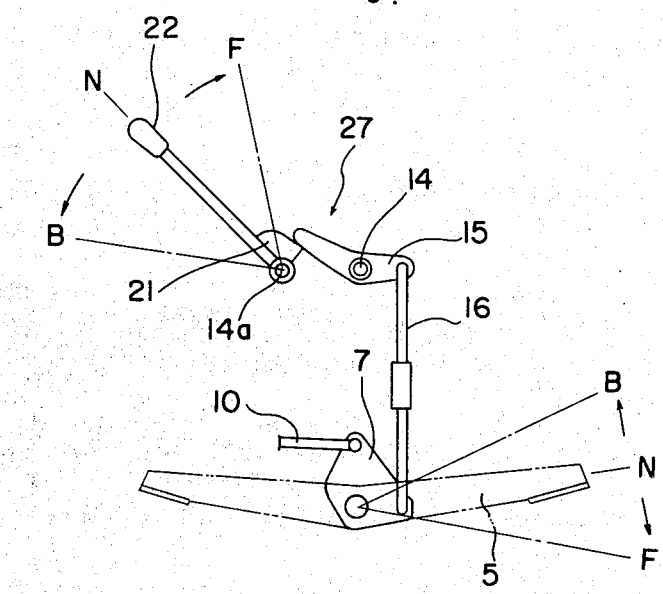
FIG. 4 is a schematic side view illustrating the operating system of a first manual lever used in the present invention.

As also apparent from the construction above-mentioned, the system of the present invention is arranged so as to permit the pedal 5 to be pressed in the speed increasing direction, as shown in FIG. 4. It is therefore possible to increase the vehicle travelling speed from the desired constant speed as necessary and thereafter to automatically reset this increased travelling speed to the initial constant speed by releasing the foot from the pedal 5, whereby an efficient work may be performed.

I claim:

1. A system of changing the travelling speed of a working vehicle comprising;
    a pedal (5) for operating a stepless speed-change means (4),
    spring means (26) for normally spring-loading said stepless speed-change means (4) to the neutral position,
    an operating unit for speed change (25) to interlockingly connect said stepless speed-change means (4) with said pedal (5),
    a first manual lever (22) for operating said stepless speed-change means (4),
    spring means (23) for maintaining said first manual lever (22) at its operated position,
    cam means (27) adapted to permit said stepless speed-change means (4) to be operated in the speed increasing direction by said pedal (5) and adapted to prevent said stepless speed-change means (4) from being operated to its neutral position, and
    coupling means (16) to interlockingly connect said cam means (27) with said operating unit and said pedal for speed change (25).

2. A system as set forth in claim 1, wherein the cam means (27) is constituted by a contact member (21) disposed at the first manual lever (22) and an arm member (15) to be swinging to come in contact with said contact member (21), said arm member (15) formed in such a free swinging manner as to permit the stepless speed-change means (4) to be operated in the speed increasing direction by the pedal (5).

3. A system of changing the travelling speed of a working vehicle comprising;
a pedal for operating a stepless speed-change means,
spring means for normally spring-loading said stepless speed-change means to the neutral position,
an operating unit for speed change to interlockingly connect said stepless speed-change means with said pedal,
a first manual lever for operating said stepless speed-change means,
spring means for maintaining said first manual lever at its operated position,
cam means including a contact member disposed relative to said first manual lever and an arm member movable to come in contact with said contact member,
said contact member and said arm member being so shaped and arranged that said contact member is adapted to be disengaged from said arm member when force more than said spring-load of said spring means of the stepless speed-change means is exerted to said arm member, regardless of the variation in the relative positions of said contact member and said arm member, and
coupling means to interlockingly connect said cam means with said operating unit for speed change.

4. A system as set forth in claim 3, further comprising a second manual lever (18) interlockingly connected to the cam means (27), and to be operated independently from the first manual lever (22), and for setting a maximum speed of the stepless speed-change means (4).

5. A system as set forth in claim 4, wherein the second manual lever (18) is swinging around the axis of rotation of the arm member 15, and is provided with a sector member 17 having therein a slot (24) formed into an arc of a circle having a center at said axis, one end of the coupling means (16) being engaged with said slot (24).

* * * * *